United States Patent Office 3,097,955
Patented July 16, 1963

3,097,955
CEMENT PRODUCT
Philip H. Harris, Upland, Calif., assignor to American Cement Corporation, Los Angeles, Calif., a corporation of Delaware
No Drawing. Filed Sept. 26, 1960, Ser. No. 58,217
6 Claims. (Cl. 106—95)

This invention relates to a hydraulic cement product and particularly to a cement product including hydraulic cement and additives for modifying the properties of concrete or mortar mixes. This application is a continuation-in-part of my copending application, Serial No. 784,875, filed January 5, 1959, and now abandoned.

Hydraulic cement is utilized in the form of a finely-ground powder which is mixed with appropriate quantities of water and a suitable aggregate to provide a plastic mass. In the setting of the cement, the cement mix first loses its plasticity and then gradually increases in hardness until a substantially final set is obtained.

The wide variety of uses to which cement mixes are applied in construction and structural work requires that the characteristics of the cement mix be adapted to meet the requirements of the particular application. While certain basic characteristics are essential for all cement mixes, the particular application of the cement mix in many instances requires emphasis upon certain characteristics even though some sacrifice of other characteristics occurs as a result. In some applications, for example, the flow characteristics of the plastic mass are of particular importance while the setting and structural properties of the cement mix are not critical. In other applications, the structural properties of the set cement assume paramount importance.

Variations in the properties of the cement mix to meet different requirements can be achieved to only a limited extent by changes in the basic formulation of water, cement and aggregate. As a consequence, a number of additives to cement mixes have been used in the prior art, which additives, when added to the cement powder or to the cement mix, impart certain characteristics to the mix in its state either as a plastic mass or a set cement. The inclusion of additives in a cement mix, while imparting the particular property desired, may, however, also affect other properties, in some instances deleteriously.

The use of hydraulic cement mixes in the coating of structures and forming of concrete floors and other paved areas illustrates an application of cement mixes wherein certain properties of the cement mix assume particular importance. One property relates to the plastic mass and may be termed "workability" or "plasticity" while the other properties relate to the process of hardening and may be termed "early strength" and "initial set."

Workability of a cement mix is a property which, while not readily amenable to measurement, becomes clearly apparent in the practical application of the cement mix. It may be qualitatively defined as the ease with which a cement mix flows while at the same time the mix remains coherent and resists segregation. The successful application of a cement mix requires that it be easily applied and rapidly spread over a supporting surface without segregation of the cement mix. Consequently, the workability of the cement mix is of particular importance. Furthermore, the increasingly widespread application of cement mixes by gunning through the use of so-called "plaster guns" increases the criticality of the fluidity of the cement mix. Since fluidity relates to the ease with which a cement mix flows at a given shearing force, it therefore, is one aspect of the broader concept of workability. The use of increased water-cement ratios to improve the fluidity of the cement mix may act to affect adversely both the workability of the cement mix by producing segregation of aggregate within the mix and the setting and structural characteristics of the cement mix.

A high early strength and a rapid initial set are required for cement mixes used for the purposes previously described in that time is frequently of considerable economic importance in such applications of cement mixes. It is particularly important that the cement attain a degree of hardness together with suitable load-bearing strength within the shortest possible period of time from the time of application so that additional work, such as finishing, can be done on the cement.

My invention is a cement product comprising a hydraulic cement, an oleaginous substance, and an oleophilic petroleum sulfonate which cement product imparts to cement mixes an unusual combination of desirable characteristics. Cement mixes made with the cement product of the present invention possess in combination characteristics of good workability, high early strength, and rapid initial set, although they cannot be classed as "quick setting."

In the cement product of my invention, the combined amount of oleaginous substance and oleophilic petroleum sulfonate added to the hydraulic cement varies from 0.05 to 0.25% by weight of the cement. The ratio of the oleaginous substance to the oleophilic petroleum sulfonate can be varied from 80:20 parts to 20:80 parts by weight. In a presently preferred mixture of the cement product, the oleaginous substance and the oleophilic petroleum sulfonate are combined in a ratio of 1:1 by weight and are added to the cement so that they constitute about 0.15% by weight of the cement.

By the term "oleaginous substance" I specifically refer to fatty acids and mixtures thereof and to the animal and vegetable fats and oils from which mixtures of fatty acids are derivable by hydrolysis. In particular, the saturated monobasic fatty acids, stearic, palmitic, myristic, and lauric, and the unsaturated monobasic fatty acids, oleic, linoleic, and linolenic, are satisfactory. Among the natural fats and oils which may be satisfactorily used in the cement product of my invention are peanut oil, cottonseed oil, coconut oil, and the like. Since saturated fatty acids, such as stearic, palmitic, myristic, and lauric, are solids or semi-solids at room temperature, I presently prefer to use the unsaturated fatty acid, oleic acid, in the cement product of my invention. It is to be understood that the term "oleic acid" is intended to include both substantially pure oleic acid as well as the commercial grade oleic acid which is known as "red oil" and includes small amounts of other fatty acids in association with the oleic acid.

By the term "oleophilic petroleum sulfonates" I refer to oil-soluble sulphonic acids obtained by the reaction of a suitable petroleum hydrocarbon and a sulfonating agent such as sulfuric acid or sodium sulfite, and derivatives of such sulfonic acids. Sulfonic acids are organic compounds containing the radical —$SO_2OH$ or —$SO_3H$, and may be alkyl, aryl, or alkyl aryl sulfonic acids. Among the suitable oil-soluble derivatives of sulfonic acids are salts obtained by neutralization with caustic soda or other alkali of the oil-soluble product produced by the reaction heretofore described. Suitable salts of oil-soluble sulfonic acids include the monovalent, such as sodium, or the divalent, such as calcium.

In the cement product of my invention, I have obtained particularly satisfactory results by using an oleophilic petroleum sulfonate sold under the trade name "Petronate HL." This petroleum sulfonate is an oleophilic sodium alkyl aryl petroleum sulfonate having a molecular weight in the range from 415 to 430. Oleophilicity of salts of sulfonic acids is generally indicated by a molecular weight in excess of 400. This sodium alkyl aryl petroleum sulfonate is readily soluble in petroleum hydrocarbons, and is commercially available in a mineral oil solution containing 62% by weight sulfonates. For convenience, the weight percentages of petroleum sulfonate given herein are based on a solution containing 62% by weight petroleum sulfonate in mineral oil.

It is recognized that salts of sulfonated hydrocarbons and oleaginous substances have been individually used in cement mixes of the prior art. For example, in "The Chemistry of Cement and Concrete," by F. M. Lea and C. H. Desch (Second Edition, 1956), reference is made on page 517 to the addition of salts of sulfonated hydrocarbons to improve workability of cement mixes and reference is made on page 469 to the effect that addition of oleic acid acts both as a grinding aid in manufacture and as a plasticizer in use by entrainment of air. There has not, however, to my knowledge been any prior disclosure of the unexpected properties attainable by combining together in a cement product both an oleophilic petroleum sulfonate and an oleaginous substance.

The combination of an oleaginous substance and oleophilic petroleum sulfonate in the cement product of my invention produces a beneficial combination of properties in cement mixes such that the characteristics of workability, early strength, and initial set are each improved without the necessity for sacrifice of one characteristic to achieve an improvement in another. This beneficial combination of properties is completely unexpected when considered in the light of the behavior of oleaginous substances and oleophilic petroleum sulfonates as individual additives to cement mixes. The manner in which the properties of cement mixes are improved through the use of the cement product of the present invention has been qualitatively demonstrated in field trials. In field trials conducted with both the cement product of the present invention and comparator cement products separately including an oleaginous substance and an oleophilic petroleum sulfonate, the improvement in workability and initial set achieved through the use of the cement product of this invention was demonstrated on a practical basis. In one field trial in which the cement mixes being compared were placed on structures by gunning, considerably reduced pump pressures were required to force cement mixes formed from the cement product of the present invention through plaster guns as compared to the pressures required to force cement mixes formed from the comparator cement products through the guns. In addition, these field tests revealed that the cement mix formed from the cement product of the present invention, once applied, was ready for finishing by troweling in a much shorter period of time than was possible with the comparator mixes.

The unexpected properties achieved through the use of the cement product of the present invention are illustrated by the data in Table 1 in which the properties of cement mixes to which have been added the cement product of the present invention are compared with the properties of cement mixes to which have been added the individual components of the cement product of the present invention. To obtain the cement mixes shown, Portland cement clinkers within the same manufacturing range were ground with 4% by weight gypsum and the weight percentages of the additives shown in Table 1. In Table 1, as well as in the succeeding description, O refers to oleic acid, P refers to a solution in mineral oil of 62% by weight sodium alkyl aryl petroleum sulfonate having a molecular weight in the range from 415 to 430, and O/P refers to the same oleic acid and the same petroleum sulfonate combined in a 1:1 ratio by weight. The percentages of additive are weight percentages based on the weight of Portland cement.

Table 1

| Additive | Air Content, Percent by Volume | Compressive Strength, lbs./sq. in. | |
|---|---|---|---|
| | | 3-day | 7-day |
| 0.1% O | 18 | 1,820 | 2,780 |
| 0.1% P | 12 | 2,270 | 3,130 |
| 0.1% O/P | 18.5 | 2,300 | 3,060 |

The air content shown as percent by volume in Table 1 provides a quantitative measure of comparison of the workability and plasticity of the cement mixes. The 3-day and 7-day compressive strengths provide a quantitative measure of the early strength of the cement. While the 0.1% O cement mix and the 0.1% O/P cement mix attain substantially the same degree of workability as indicated by the air content, the early strength of the 0.1% O/P cement mix, as shown by the 3-day and 7-day compressive strength measurements, is considerably greater than the early strentgh of the 0.1% O cement mix. On the other hand, as compared to the 0.1% P cement mix, the 0.1% O/P cement mix has substantially the same earily strength and much greater workability as indicated by the comparative air contents. These data, threfore, confirm the qualitative observations of the above-described field trials and emphasize the unexpected result whereby the combination of oleic acid, a sodium alkyl aryl petroleum sulfonate, and Portland cement produce in cement mixes a high degree of workability without sacrifice of early strength. The oleic acid and the petroleum sulfonate act together in the cement mix to achieve the benefits of high air content consistent with the benefits of high early strength.

Comparable results were obtained in the case of cement mixtures, mixed as described above, wherein the cement product of my invention consisted of the combination of peanut oil, a sodium alkyl aryl petroleum sulfonate, and Portland cement, and the combination of stearic acid, a sodium alkyl aryl petroleum sulfonate, and Portland cement.

In Table 2, the improvement in air content and, therefore, workability of the cement mix achieved by the combination of oleic acid, sodium alkyl aryl petroleum sulfonate and Portland cement is demonstrated by comparison with the Portland cement without any additive.

Table 2

| Additive | Air Content, Percent by Volume | Compressive Strength, lbs./sq. in. | |
|---|---|---|---|
| | | 3-day | 7-day |
| None | 7 | 1,700 | 2,400 |
| 0.075% O/P | 14 | 1,920 | 2,710 |

The addition of the oleic acid and petroleum sulfonate increased the air content of the normal cement mix by 100% while at the same time an actual increase in the 3-day and 7-day compressive strengths was obtained. These additives in combination, therefore, act in a unique manner to improve the workability of the cement mix while, at the same time, not only does no sacrifice in early strength occur but an actual improvement in early strength is obtained. Furthermore, the initial set is such that the finishing time for the cement mix, once applied, is relatively short.

While I have described the addition of the oleic acid and petroleum sulfonates in a ratio of 1:1 by weight, it is to be understood that the ratio of oleic acid to petroleum sulfonate may be varied from 20:80 parts to 80:20 parts by weight. The combined amount of these additives is presently preferred to be about 0.15% by weight of the Portland cement. However, beneficial results are obtained as the combined weight of additives are varied in the range from 0.05% to 0.25% by weight of the Portland cement. Additions wherein the combined weight of the additives is substantially in excess of 0.25% by weight of the Portland cement produce no appreciable improvement in the beneficial results obtainable by additions of 0.25% and less. Furthermore, the relative cost of the additives makes additions in excess of 0.25% economically unattractive.

As a convenient method of adding the additives to the Portland cement, oleic acid in the proper proportion is dissolved in the petroleum sulfonate-mineral oil solution. The combined additives may then be mixed with the Portland cement clinker before grinding and be ground therewith. It has been found that the known benefits of oleic acid as a grinding aid are enhanced by the combination of petroleum sulfonate with the oleic acid so that improved grinding results are obtained by adding the combined additives to the clinker prior to grinding or at the time of grinding. In the alternative, the combined additives may be added to the cement mix during various stages of mixing of the hydraulic cement concrete or mortar. Furthermore, the additives may be separately added to either the clinker or the concrete mix in the proper proportions either before or after grinding.

In addition to the improvements in the characteristics of workability and high early strength achieved through the use of the cement product of the present invention in cement mixes, other characteristics of the cement product provide significant advantages. In its dry state, the cement product has a hydrophobic property so that during periods of storage the cement product resists hydration. While the use of oleic acid to render surfaces such as cement partially hydrophobic by the formation of a water-repellant film on such surfaces is a part of the prior art, the combination of oleic acid and petroleum sulfonate in the cement product of the present invention acts to make the Portland cement more effectively hydrophobic. This is demonstrated by comparative data as to compressive strengths of set cements formed from cement products which had been exposed to differing hydrating atmospheres. A cement product including only oleic acid and a cement product including both oleic acid and petroleum sulfonate were exposed to a humidity of 100% for 24 hours. Test cubes were then formed from these cement products. As compared to test cubes formed from control samples of each cement product, the 3-day and 7-day compressive strengths of the test cement product including only oleic acid were reduced by 2% and 4% respectively as compared to its control sample while an actual increase in compressive strengths was observed for the cement product including both oleic acid and petroleum sulfonate as compared to its control samples.

Since the cement product of the present invention produces a set cement having greater structural strength than Portland cement of comparable specific surface to which no additive has been made, it becomes possible to achieve predetermined specifications of compressive strength at a much lower degree of fineness through the addition of the additives of the present invention. In consequence, by reducing the extent to which grinding of the clinker must be carried out to achieve a specified compressive strength, energy requirements for grinding are materially reduced. On the other hand, it also becomes possible to achieve strengths of an unusually high order by grinding a clinker including the additives of the present invention to a higher degree of fineness.

The applicability of the cement product of the present invention to the ever-increasing use of guns for application of cement mixes has previously been discussed. The fluidity of cement mixes formed from the cement product of the present invention makes such cement mixes particularly advantageous for use in gunning applications. It has been found that these advantageous characteristics of the cement mixes may be further improved by incorporating in the cement mix materials such as asbestos, clay, diatomaceous earth or bentonite. The problems of blockage which occur by reason of variations in the characteristics of the sand in the hydraulic cement concrete mixes, for example, can be better avoided through the use of these materials in conjunction with the additives of the present invention.

It is to be understood that the description of the utility of the cement product of the present invention with particular reference to the combination of oleic acid and an oleophilic sodium alkyl aryl petroleum sulfonate with Portland cement is in no sense to be construed as limiting the cement product of the invention to these materials. Other oleaginous substances and oleophilic petroleum sulfonates as herein defined may also be advantageously utilized as herein described.

I claim:

1. A cement product consisting essentially of a hydraulic cement, water, from about 0.02% to about 0.13% by weight of the cement of an oleaginous substance selected from the group consisting of fatty acids and fats and oils convertible by hydrolysis to fatty acids, and from about 0.02% to about 0.13% by weight of the cement of an oleophilic petroleum sulfonate, the combined amount of oleaginous substance and oleophilic petroleum sulfonate varying in the range from about 0.05% to about 0.25% by weight of the cement.

2. A cement product consisting essentially of a hydraulic cement, water, and from about 0.05% to about 0.25% by weight of the cement of a mixture consisting of an oleaginous substance selected from the group consisting of fatty acids and fats and oils convertible by hydrolysis to fatty acids, and an oleophilic petroleum sulfonate, the proportion of the oleaginous substance to the oleophilic petroleum sulfonate in the mixture varying from 80:20 parts to 20:80 parts by weight.

3. A cement product consisting essentially of a hydraulic cement, water, and from about 0.05% to about 0.25% by weight of the cement of a mixture consisting of an oleaginous substance selected from the group consisting of fatty acids and fats and oils convertible by hydrolysis to fatty acids, and an oleophilic petroleum sulfonate, the proportion of the oleagious substance to the oleophilic petroleum sulfonate in said mixture being 1:1 parts by weight.

4. A cement product consisting essentially of Portland cement, water, and from about 0.05% to about 0.25% by weight of the cement of a mixture consisting of an oleaginous substance selected from the group consisting of fatty acids and fats and oils convertible by hydrolysis to fatty acids, and an oleophilic petroleum sulfonate, the proportion of the oleaginous substance to the oleophilic petroleum sulfonate in the mixture varying from 80:20 parts to 20:80 parts by weight.

5. A cement product consisting essentially of Portland cement, water, and from about 0.05% to about 0.25% by weight of the cement of a mixture consisting of oleic acid and an oleophilic sodium alkyl aryl petroleum sulfonate, the proportion of oleic acid to said petroleum sulfonate in said mixture varying from 80:20 parts to 20:80 parts by weight.

6. Cement product in accordance with claim 5 wherein the oleic acid and the oleophilic sodium alkyl aryl petroleum sulfonate are in a ratio of 1:1 parts by weight.

References Cited in the file of this patent

UNITED STATES PATENTS

| | | |
|---|---|---|
| 2,305,113 | Scripture | Dec. 15, 1942 |
| 2,614,939 | Keating | Oct. 21, 1952 |
| 2,878,875 | Dunlap et al. | Mar. 24, 1959 |